US006979947B2

(12) United States Patent
Yaniv et al.

(10) Patent No.: US 6,979,947 B2
(45) Date of Patent: Dec. 27, 2005

(54) NANOTRIODE UTILIZING CARBON NANOTUBES AND FIBERS

(75) Inventors: Zvi Yaniv, Austin, TX (US); Richard Lee Fink, Austin, TX (US)

(73) Assignee: SI Diamond Technology, Inc., Austin, TX (US)

( * ) Notice: Subject to any disclaimer, the term of this patent is extended or adjusted under 35 U.S.C. 154(b) by 0 days.

(21) Appl. No.: 10/191,748

(22) Filed: Jul. 9, 2002

(65) Prior Publication Data

US 2004/0007955 A1    Jan. 15, 2004

(51) Int. Cl.$^7$ .............................................. H01J 31/12
(52) U.S. Cl. ..................... 313/495; 313/496; 313/309
(58) Field of Search ................ 313/306–311, 495–497, 313/336, 351, 346; 445/49–51; 250/398, 250/423 F (56) References Cited

U.S. PATENT DOCUMENTS

| | | | |
|---|---|---|---|
| 3,710,173 A * | 1/1973 | Hutchins, IV et al. ..... | 313/68 A |
| 3,717,786 A * | 2/1973 | Massey et al. ............. | 313/68 R |
| 3,742,286 A * | 6/1973 | Frankland et al. ......... | 313/68 D |
| 3,796,909 A * | 3/1974 | Chang et al. .............. | 313/92 R |
| 3,866,077 A | 2/1975 | Baker et al. | |
| 4,272,699 A | 6/1981 | Faubel et al. | |
| 4,728,851 A | 3/1988 | Lambe | |
| 5,038,070 A * | 8/1991 | Bardai et al. .............. | 313/309 |
| 5,773,921 A * | 6/1998 | Keesmann et al. ......... | 313/336 |
| 6,027,388 A * | 2/2000 | Jones et al. ................ | 445/24 |
| 6,097,138 A | 8/2000 | Nakamoto | |
| 6,239,547 B1 | 5/2001 | Uemura et al. | |
| 6,265,466 B1 | 7/2001 | Glatkowski et al. | |
| 6,359,383 B1 | 3/2002 | Chuang et al. | |
| 6,380,671 B1 | 4/2002 | Lee | |
| 6,383,923 B1 | 5/2002 | Brown et al. .............. | 438/666 |
| 6,437,503 B1 * | 8/2002 | Konuma ..................... | 313/495 |
| 6,512,235 B1 * | 1/2003 | Eitan et al. ................. | 250/398 |
| 6,545,396 B1 * | 4/2003 | Ohki et al. ................. | 313/309 |
| 6,590,322 B2 * | 7/2003 | Hsu ........................... | 313/310 |
| 6,626,720 B1 * | 9/2003 | Howard et al. ............. | 445/24 |
| 6,630,772 B1 * | 10/2003 | Bower et al. ............... | 313/311 |
| 6,762,543 B1 * | 7/2004 | Kang et al. ................. | 313/311 |
| 2002/0001905 A1 | 1/2002 | Choi et al. ................. | 438/268 |
| 2002/0006489 A1 | 1/2002 | Goth et al. | |

FOREIGN PATENT DOCUMENTS

| | | |
|---|---|---|
| EP | 0 905 737 A1 | 3/1999 |
| EP | 0 913 508 A2 | 5/1999 |
| EP | 0 951 047 A2 | 10/1999 |
| EP | 1 047 097 A1 | 10/2000 |

(Continued)

OTHER PUBLICATIONS

A. A. G. Driskill-Smith et al., "The 'nanotriode:' A nanoscale field-emission tube," *Applied Physics Letters*, 1999 American Institute of Physics, pp. 2845-2847.

*Primary Examiner*—Wilson Lee
(74) *Attorney, Agent, or Firm*—Kelly K. Kordzik; Winstead Sechrest & Minick P.C.

(57) ABSTRACT

A field emission device includes a substrate in which a well has been formed. Carbon fibers with a high aspect ratio are deposited within the well, wherein the well is sufficiently deep so that axes of a large number of the carbon fibers are substantially coaxial with a long axis of the well. A conductive anode is positioned relative to the substrate so that an electric potential applied between the conductive anode and the substrate causes an emission of electrons from the carbon fibers towards the conductive anode.

16 Claims, 6 Drawing Sheets

FOREIGN PATENT DOCUMENTS

| | | |
|---|---|---|
| EP | 1 061 544 A1 | 12/2000 |
| EP | 1 061 555 A1 | 12/2000 |
| EP | 1 073 090 A2 | 1/2001 |
| EP | 1 102 298 A1 | 5/2001 |
| EP | 1 102 299 A1 | 5/2001 |
| EP | 1 122 759 A2 | 8/2001 |
| EP | 1 146 541 A2 | 10/2001 |
| JP | 58-216327 | 2/1994 |
| JP | 10-050240 | 2/1998 |
| JP | 9-221309 | 6/1998 |
| JP | 10-199398 | 7/1998 |
| JP | 11-111161 | 4/1999 |
| JP | 11-135042 | 5/1999 |
| JP | 11-260244 | 9/1999 |
| JP | 11-260249 | 9/1999 |
| JP | 11-297245 | 10/1999 |
| JP | 11-329311 | 11/1999 |
| JP | 11-329312 | 11/1999 |
| WO | WO 98/21736 | 5/1998 |
| WO | WO 02/30816 A1 | 4/2002 |

* cited by examiner

NANOTRIODE UTILIZING CARBON NANOTUBES AND FIBERS

The U.S. Government has a paid-up license in this invention as provided for by the terms of SBIR Award No. NAS3-01017.

TECHNICAL FIELD

The present invention relates in general to microelectronics circuitry, and more specifically, to use of field emission devices in such circuitry.

BACKGROUND INFORMATION

Utilizing the electron emission from carbon nanotubes, carbon fibers or other columnar narrow carbon structures, one can build a transistor based on a diode, triode or even higher order transistor structure (e.g., pentode).

Generally, the columnar narrow and sharp carbon structures such as fibers, tubes, etc., have a length of over 2 micrometers and sometimes can achieve lengths over 10 micrometers. In order to utilize the field emission properties of these carbon films, one needs to create cavities, around which the transistor structures are built and a certain low-pressure environment or vacuum is held.

An example is given by A. A. G. Driskill-Smith, D. G. Hasko, and H. Ahmed ("The 'nanotriode:' A nanoscale field-emission tube", Applied Physics Letters, Vol. 75, Number 18, Nov. 1, 1999, p. 28451) where they show the fabrication sequence of a nanotriode made on a tungsten (W) wafer. They also show how this type of device can be used as a transistor where the gate modulates the current that goes to the anode. In this example, the triode was built up on the tungsten wafer. This requires many different deposition layers, some of which can be quite thick. The scale of the device shown is less than 1 micron which will not accommodate long carbon nanotube structures that are longer.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

In the following description, numerous specific details are set forth such as specific dimensions or materials, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail.

Refer now to the drawings wherein depicted elements are not necessarily shown to scale and wherein like or similar elements are designated by the same reference numeral through the several views.

Figure 1:
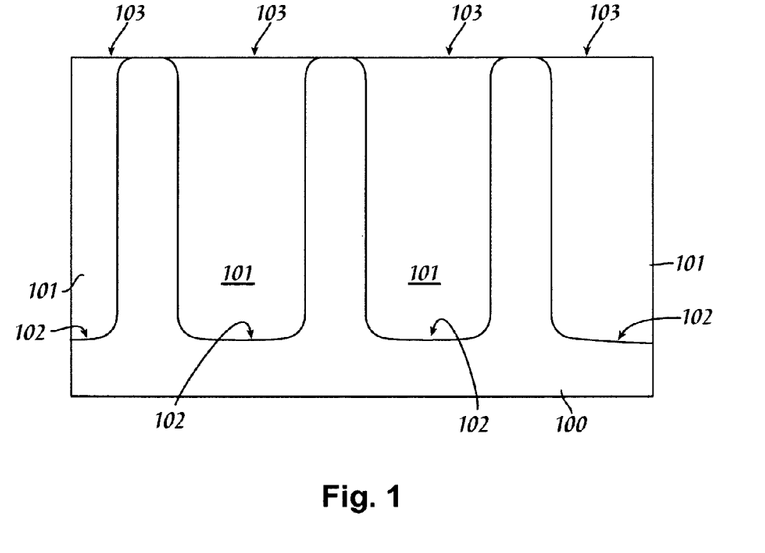
FIG. 1 illustrates vertical trenches in silicon.

The present invention addresses the foregoing needs by creating narrow cavities directly into a silicon wafer. These cavities can be deeper than 1 micrometer. FIG. 1 illustrates a cross-section of a silicon wafer 100 embossed with cavities 101 each deeper than 1 micrometer.

Generally, a metal electrode 102 is prepared at the bottom of the cavities 101. In particular, catalytic metals are used such as iron, nickel or cobalt based for the selective growth of carbon nanostructures in each cavity 101. At the surface of each cavity, a strong dielectric material, organic or inorganic, is deposited (see FIGS. 4A–4O) with a breakdown voltage of over 1,000,000 Volts/cm. Such materials could be silicon nitride, silicon oxide, silioxinitrides, BCB made by Dow Chemicals, liquid glass or polyimides, or other organic dielectrics.

On the top of this dielectric layer a gate metal is formed. Another dielectric layer may be formed on top of the gate layer and an anode metal layer is placed on top of this second dielectric layer. By modulating the current between the metal cathode 102 at the bottom of the cavity 101 and the anode on the top of the cavity 101 with the help of the gate metal, transistor operations can be achieved as shown below.

Figure 2:
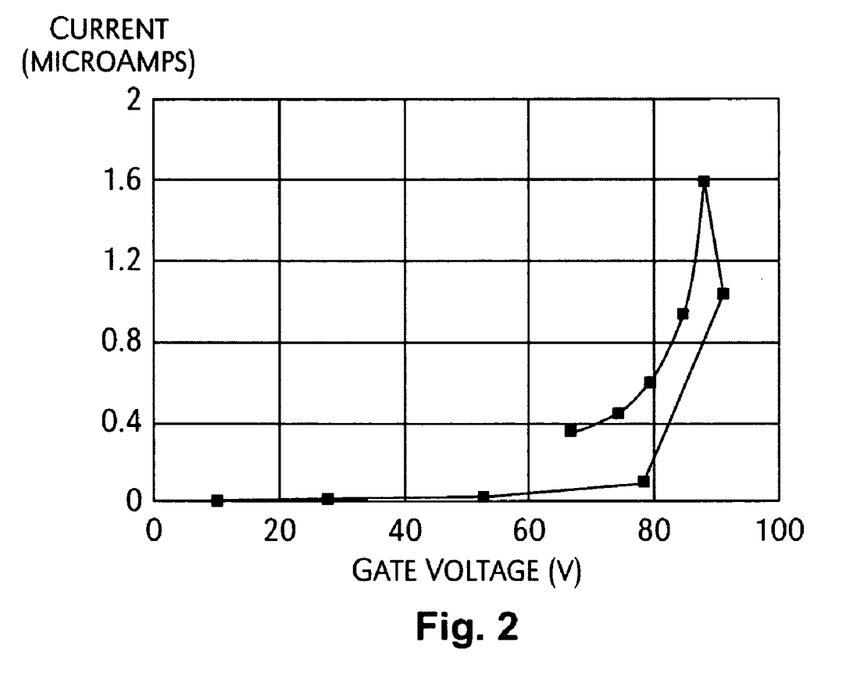
FIG. 2 illustrates a graph of anode current versus gate voltage with the anode voltage set at 100 volts.

An alternative approach (See FIGS. 4N–4O) would be to not deposit a separate anode layer, but to use another silicon wafer or other conducting substrate that is placed next to (on top of) the second dielectric layer, opposite the metal gate layer. The anode wafer can be in physical contact to the second dielectric layer or it can be placed some distance away, as much as 1 centimeter or more. In this case, the device needs to be operated in a vacuum chamber or vacuum envelope since the presence of air at atmospheric pressures would interfere with the operation of the device. This structure was used to obtain the data shown in FIGS. 2 and 3. FIG. 2 plots the anode current as a function of gate voltage for a device that is similar to what is shown in FIG. 4N or 4O. The gate voltage is the voltage between cathode electrode 415 and gate electrode 416. The anode current is the current of electrons that strike the anode 414 that is held at a potential of 100V. The graph shows that one can switch the current going to the anode at 100V with swing voltages of 20V or less between the gate and cathode.

Figure 3:
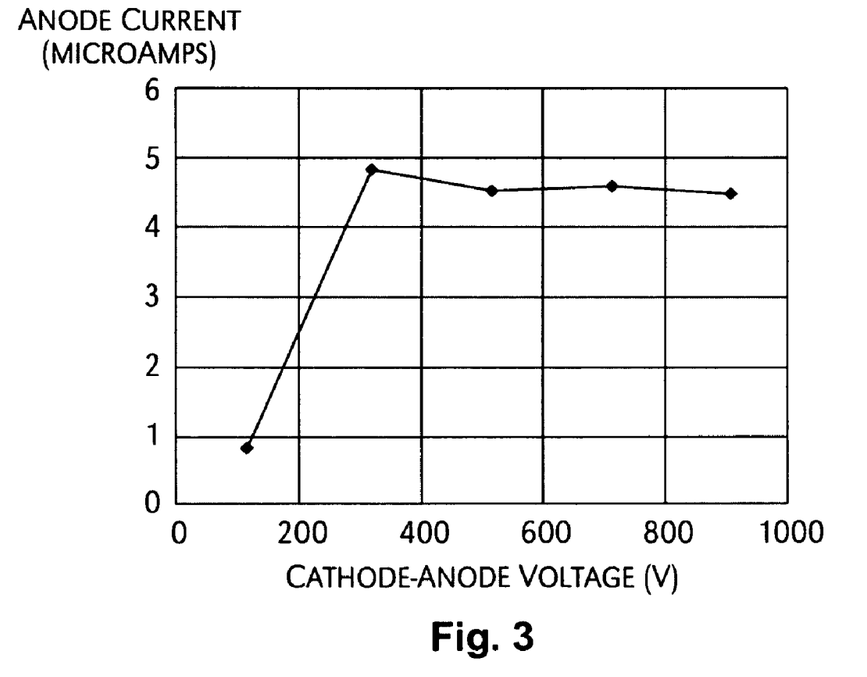
FIG. 3 illustrates a graph of anode current versus cathode-anode voltage with the gate voltage set at 10 volts.

FIG. 3 shows that the gate is effective in switching the anode current ON and OFF best below 300V. Above 300V, the anode field saturates the transistor behavior; the gate voltage is not as an effective switch to turn OFF the current to the anode.

This behavior is similar to standard microelectronic devices made using hot filament electron sources (the "vacuum tube"). Vacuum tubes are still used for certain applications. This structure has the lowest capacitance allowing for higher frequency operation.

These transistor structures can be utilized as any transistor in a microelectronic circuit. Furthermore, these structures can be utilized for wafer-to-wafer communication for three-dimensional wafer packaging. For example, by creating the cavities in one wafer and having similar cavities and organizations on another wafer, by combining the two wafers and bonding them face-to-face in a vacuum, a very economical and easy communication from wafer-to-wafer can be established. Other applications of these cavities can be as smart sensors, utilizing the changes in the pressure in the cavity, for example in space.

Figure 4A:
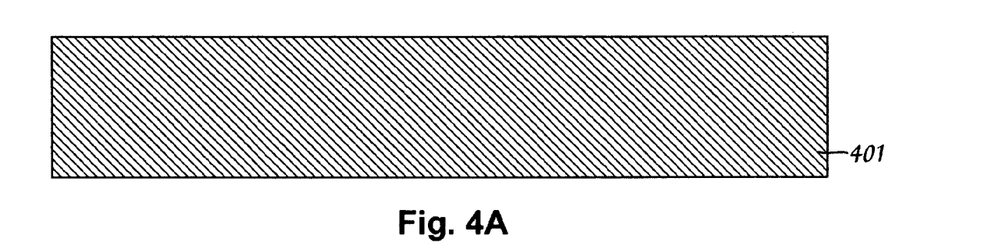
FIGS. 4A–4O illustrate the steps for manufacturing a nanotriode.
Figure 4B:
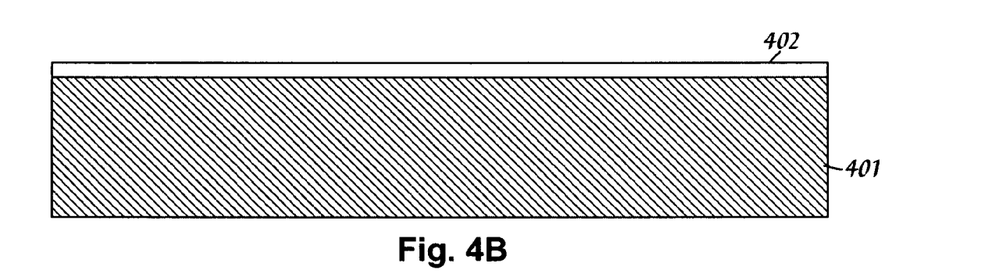
Figure 4C:
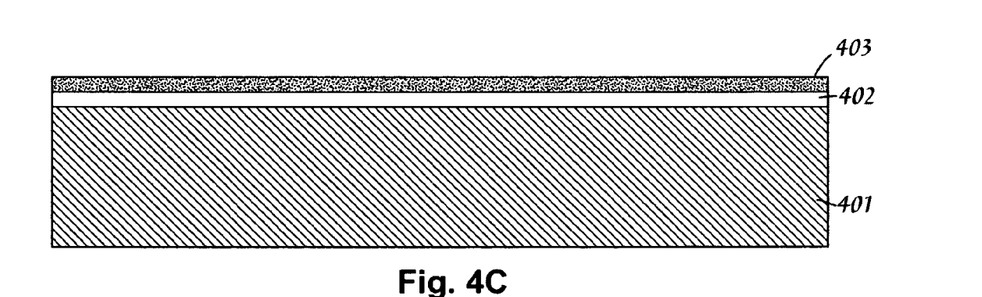
Figure 4D:
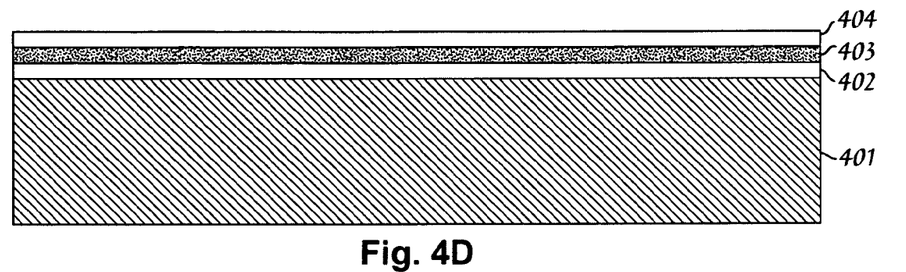
Figure 4E:
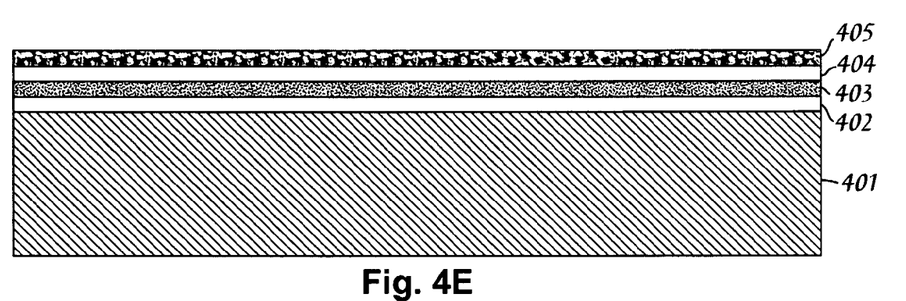
Figure 4F:
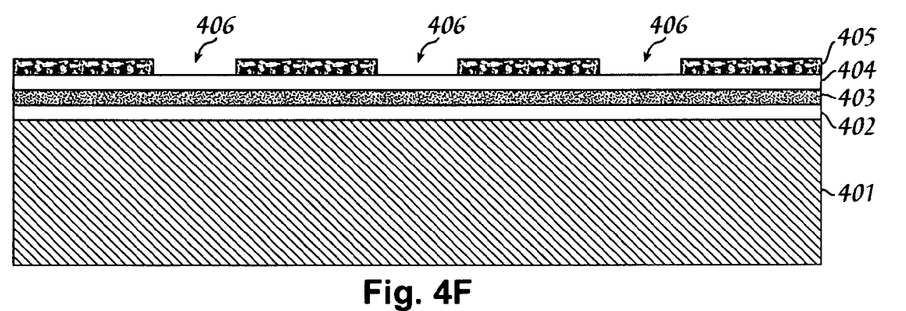
Figure 4G:
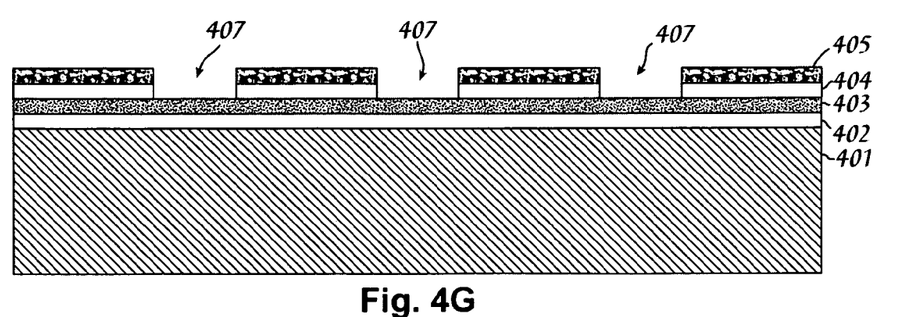

Referring to FIGS. 4A–4O, an example of a process for fabricating a nanotriode in accordance with the present invention is illustrated. In FIG. 4A, a silicon wafer 401 is cleaned in a typical manner. In FIG. 4B, a dielectric layer 402 of approximately 1 micron thick is deposited on top of the silicon wafer 401. In FIG. 4C, a metal (or other conductive material) gate layer 403 of approximately 1,000 Angstroms thick is deposited on top of the dielectric layer 402. In FIG. 4D, a second dielectric layer 404 of approximately 1 micron thick is placed on top of the metal gate layer 403. In FIG. 4E, a sacrificial hard mask layer (e.g., aluminum) 405 of approximately 1,000 angstroms thick is deposited on top of the second dielectric layer 404. In FIG. 4F, holes 406 are patterned and etched in the hard mask layer 405 all the way through the layer. This may be done using conventional techniques commonly used in the silicon micro-fabrication industry. In FIG. 4G, using the pattern of the hard mask layer 405 created in FIG. 4F, holes 407 are etched in the second dielectric layer 404.

Figure 4H:
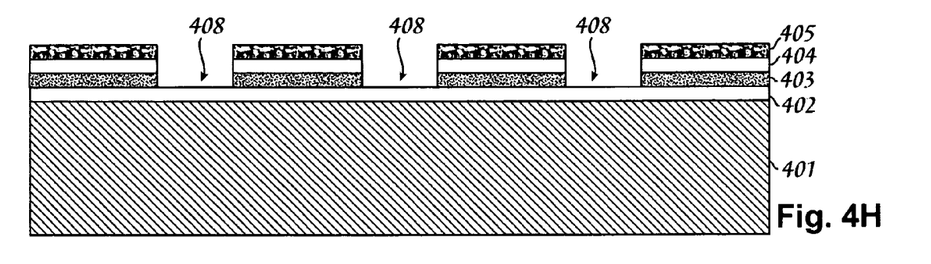
Figure 4I:
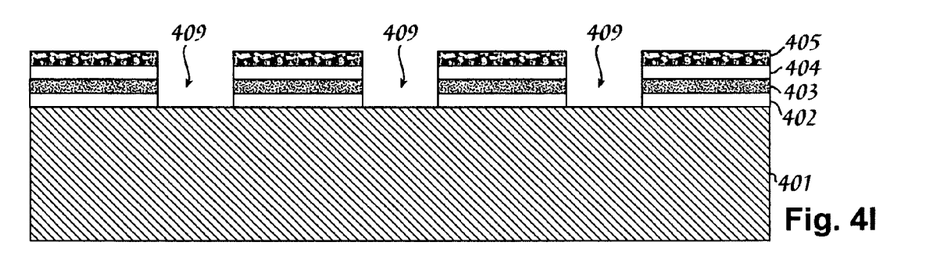
Figure 4J:
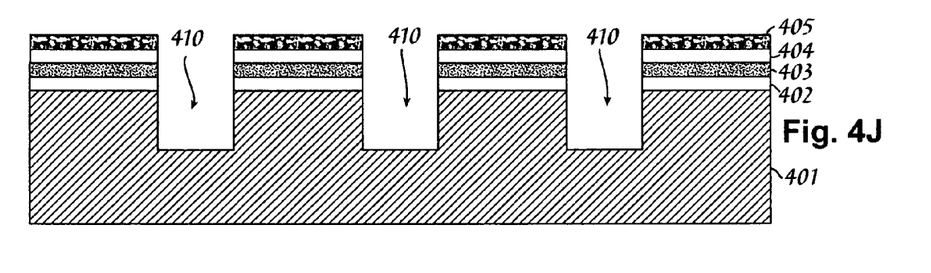
Figure 4K:
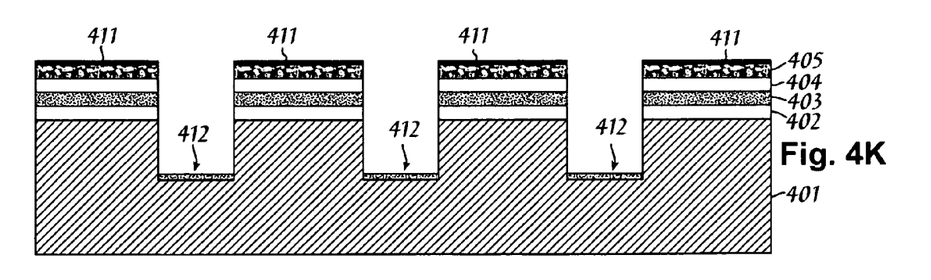
Figure 4L:
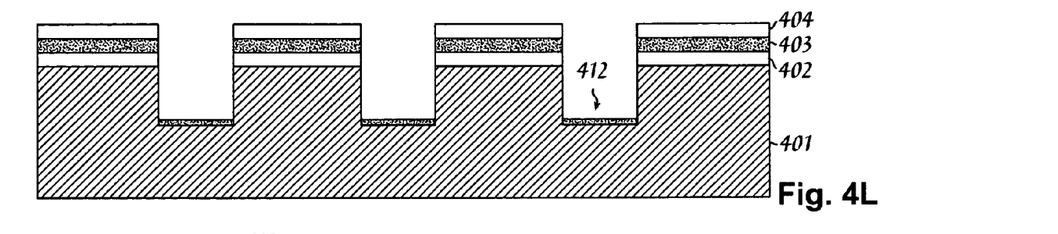
Figure 4M:
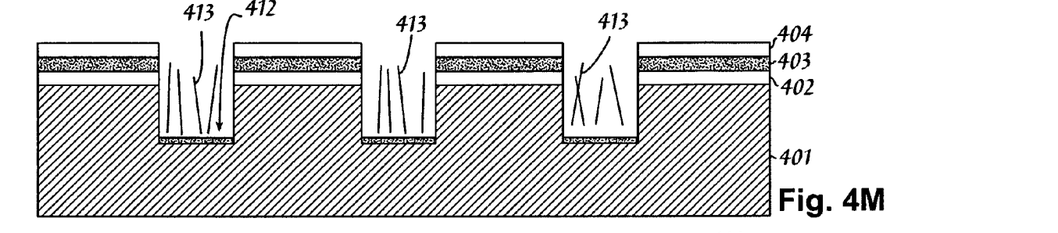
Figure 4N:
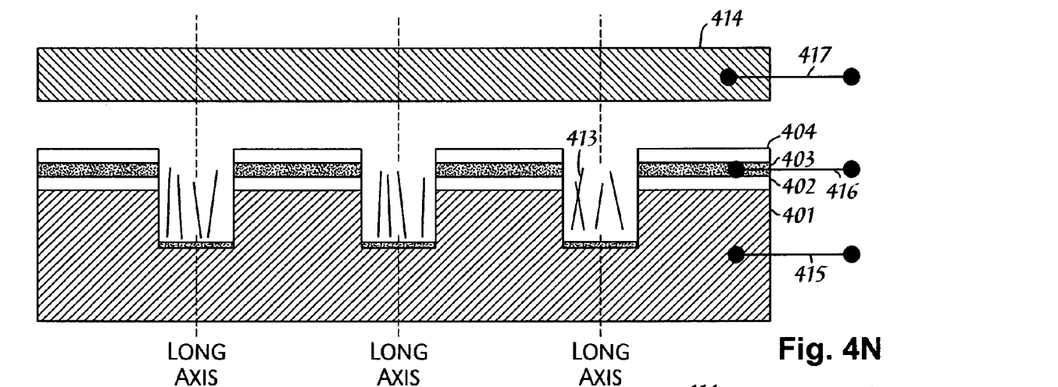
Figure 4O:
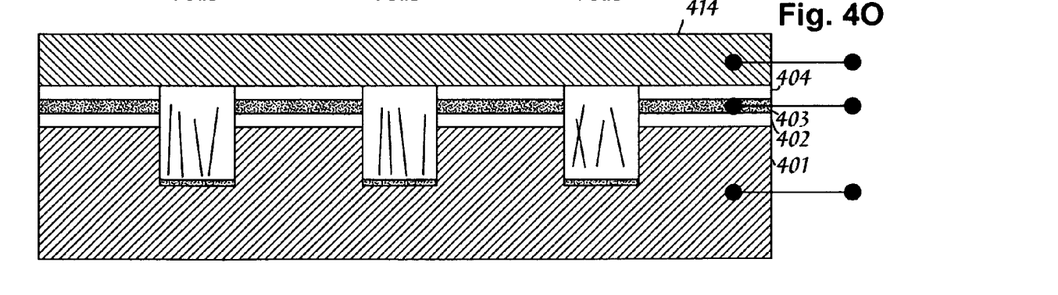

In FIG. 4H, the pattern created through the second dielectric layer 404 in FIG. 4G is used to etch through the metal gate layer 403 to create holes 408. In FIG. 4I, the pattern created through the metal gate layer 403 in FIG. 4H to create holes 408 is used to etch through the first dielectric layer 402 to create holes 409. In FIG. 4J, the pattern created by holes 409 is used to etch deep and narrow holes, or wells, in silicon wafer 401. These holes can be as deep as 20 microns or more. In FIG. 4K, a metal layer of iron, nickel or cobalt (or some other metal layer or an alloy or mixture of these metals) of approximately 100 angstroms thick is deposited at the bottom of the holes 409 as layer 412, and on top of the mask layer 405 as layer 411. In FIG. 4L, the hard mask layer 405 and layer 411 are etched away. In FIG. 4M, carbon nanotube material 413 is grown in the holes on top of the layers 412. Various methods can be used to grow carbon nanotubes into the holes. Using the thin film catalyst, carbon nanotube material can be grown in a mixture of hydrogen and hydrocarbon gases. These techniques are well known in the state of the art. A high temperature thermal CVD process can be used or one can activate the plasma using radio frequency excitation, DC glow discharge, or hot filament CVD techniques.

Nanoparticle catalysts can also be used. In this case, the particles are deposited by spraying or other means at the bottom of the holes 410, replacing the thin film catalyst deposited as shown in FIG. 4K.

One can also print or spray carbon nanotubes directly into the holes. One method involves suspending carbon nanotubes in a solvent such as isopropyl alcohol or acetone and using an airbrush to spray the material into the holes. One can also mix carbon nanotubes in a paste and screen print them into the holes.

In FIG. 4N, an electrical conducting anode 414 is placed some distance away. Electrical connections are made to the device electrodes. For example, an electrical connection 415 is made to the silicon wafer 401, an electrical connection 416 is made to the metal gate layer 403, and an electrical connection 417 is made to the anode 414. In this way, voltages (not shown) can be applied using the electrical connections to create an electric field to cause emission of electrons from the carbon nanotubes 413 to the anode 414. The gate electrode 403 can be used to modulate such an electron emission. In FIG. 4O, note that the second dielectric layer 404 is optional, and may be utilized if the conducting anode 414 makes physical contact with the rest of the device. In this case, the anode 414 can be sealed to the device as shown.

Although the present invention and its advantages have been described in detail, it should be understood that various changes, substitutions and alterations can be made herein without departing from the spirit and scope of the invention as defined by the appended claims.

What is claimed is:

1. A field emission device comprising:
   a substrate in which a well has been formed;
   carbon fibers deposited within the well, wherein the well is sufficiently deep so that long axes of a large number of the carbon fibers are substantially coaxial with a long axis of the well; and
   a conductive anode positioned relative to the substrate so that an electric potential applied between the conductive anode and the substrate causes an emission of electrons from the carbon fibers towards the conductive anode, wherein the long axis of the well is substantially perpendicular to a surface of the conductive anode facing towards the substrate.

2. The field emission device as recited in claim 1, further comprising:
   a gate electrode positioned between the substrate and the conductive anode.

3. The field emission device as recited in claim 1, wherein the carbon fibers are carbon nanotubes.

4. The field emission device as recited in claim 2, wherein the carbon fibers are carbon nanotubes.

5. The field emission device as recited in claim 1, wherein the well is greater than 1 micron deep.

6. The field emission device as recited in claim 4, wherein the well is greater than 1 micron deep.

7. The field emission device as recited in claim 6, further comprising:
   a metal layer deposited in a bottom of the well, wherein the carbon nanotubes are deposited on the metal layer.

8. The field emission device as recited in claim 4, wherein the substrate is made of silicon.

9. The field emission device as recited in claim 8, further comprising:
   a dielectric layer between the substrate and the gate electrode.

10. The field emission device as recited in claim 9, further comprising:
    a dielectric layer between the gate electrode and the conductive anode.

11. A device comprising:
    a substrate having a well formed therein, wherein a bottom of the well is on a different plane than a top surface of the substrate;
    carbon fibers deposited within the well, wherein the well is sufficiently deep so that long axes of some of the carbon fibers are substantially coaxial with a long axis of the well, wherein the long axis of the well is substantially perpendicular to a surface of the conductive anode facing towards the substrate; and
    a conductive anode positioned a predetermined distance from the substrate.

12. The device as recited in claim 11, wherein the conductive anode is positioned relative to the substrate so that an electrical potential applied between the conductive anode and the substrate causes an emission of electrons from the carbon fibers towards the conductive anode.

13. The device as recited in claim 11, further comprising:
    a dielectric layer deposited over the top surface of the substrate and not in the bottom of the well.

14. The device as recited in claim 13, further comprising:
    a gate electrode deposited over the dielectric layer and not in the bottom of the well.

15. A field emission device comprising:
a cathode in which a well has been formed;
carbon fibers positioned within the well, wherein the well is sufficiently deep so that long axes of a large number of the carbon fibers are substantially coaxial with a long axis of the well; and
an anode positioned relative to the cathode so that an electric field causes an emission of electrons from the carbon fibers towards the anode, wherein the well is deeper along its long axis than it is wide.

16. The field emission device as recited in claim 15, wherein the long axis of the well is substantially perpendicular to a surface of the anode facing towards the substrate.

* * * * *